(12) United States Patent
Gulde

(10) Patent No.: US 7,997,612 B2
(45) Date of Patent: Aug. 16, 2011

(54) STEERING WHEEL ARRANGEMENT

(75) Inventor: Alexander Gulde, Haimhausen (DE)

(73) Assignee: Autoliv Development AB, Vargarda (SE)

( * ) Notice: Subject to any disclaimer, the term of this patent is extended or adjusted under 35 U.S.C. 154(b) by 148 days.

(21) Appl. No.: 12/377,248

(22) PCT Filed: Sep. 4, 2006

(86) PCT No.: PCT/SE2006/001005
§ 371 (c)(1),
(2), (4) Date: Feb. 11, 2009

(87) PCT Pub. No.: WO2008/030143
PCT Pub. Date: Mar. 13, 2008

(65) Prior Publication Data
US 2010/0176579 A1    Jul. 15, 2010

(51) Int. Cl.
*B60Q 3/00* (2006.01)
(52) U.S. Cl. .................... 280/731; 362/488
(58) Field of Classification Search ............. 280/731, 280/735; 362/37, 488; 200/61.54; 340/438
See application file for complete search history.

(56) References Cited

U.S. PATENT DOCUMENTS

| | | | | |
|---|---|---|---|---|
| 4,938,504 A | * | 7/1990 | Fukuda et al. ............. | 280/731 |
| 5,505,483 A | * | 4/1996 | Taguchi et al. ............ | 280/728.2 |
| 6,402,196 B1 | * | 6/2002 | Nicot .......................... | 280/771 |
| 6,848,706 B2 | * | 2/2005 | Kreuzer et al. ............. | 280/728.3 |
| 7,441,801 B2 | * | 10/2008 | Nakamura et al. .......... | 280/731 |
| 2002/0153712 A1 | | 10/2002 | Kreuzer et al. | |
| 2004/0084291 A1 | * | 5/2004 | Adachi et al. .............. | 200/61.54 |
| 2006/0039131 A1 | * | 2/2006 | Nakazawa et al. .......... | 362/43 |

FOREIGN PATENT DOCUMENTS

| DE | 19855554 A1 | 6/2000 |
|---|---|---|
| EP | 1251044 A2 | 10/2002 |

OTHER PUBLICATIONS

US 6,752,416, 06/2004, Kreuzer et al. (withdrawn)

* cited by examiner

*Primary Examiner* — Paul N Dickson
*Assistant Examiner* — Timothy D Wilhelm
(74) *Attorney, Agent, or Firm* — Harness, Dickey & Pierce, P.L.C.

(57) ABSTRACT

A steering wheel arrangement includes a steering wheel frame and an airbag unit positioned at the hub region of the steering wheel frame. The airbag unit includes an airbag housing and an airbag cover. The airbag cover covers the airbag housing and incorporating opaque cover portion projecting outwardly beyond a side of the airbag housing. The arrangement further includes a light source shielded behind the cover portion and positioned outside the airbag housing such that light emitted from the light source passes outwardly from beneath the opaque cover portion and is incident on, and illuminates, part of the steering wheel frame.

21 Claims, 3 Drawing Sheets

STEERING WHEEL ARRANGEMENT

CROSS-REFERENCE TO RELATED APPLICATIONS

This application is a 371 U.S. National Stage of International Application No. PCT/SE2006/001005, filed Sep. 4, 2006 and published in English as WO 2008/030143 A1 on Mar. 13, 2008, the disclosures of which are expressly incorporated herein by reference.

DESCRIPTION OF INVENTION

The present invention relates to a steering wheel arrangement, and more particularly to a steering wheel arrangement configured for illuminating part of the surface of the steering wheel to provide ambient lighting within a motor vehicle cabin.

Lighting has long been used in the interior of motor vehicles for operational purposes, for example to provide a visual warning to a driver of the vehicle or in back-lit displays finding particular utility during night-time driving.

Increasingly, the market is demanding use of lighting other than for solely operational purposes, for example to provide an appealing ambience within the cabin of the motor vehicle. It is known, for example, to provide ambient lighting in the vicinity of door panels.

Such ambient lighting is thought to provide a more calming environment for the driver and passengers of the motor vehicle, thus perhaps promoting safer driving, and is now also often perceived by consumers as being indicative of the quality of a particular motor vehicle.

However, the designer of such ambient lighting within the motor vehicle is faced with competing technical considerations.

On the one hand, any system for creating an ambient lighting atmosphere should, by its very nature, be discreet and preferably largely concealed within the interior of the vehicle, whilst also providing the desired ambience. On the other hand, it is imperative that the configuration of the ambient lighting system does not interfere with the functionality of the cabin of the motor vehicle.

Any ambient lighting system must therefore be specifically configured for full and preferably "invisible" physical integration within the overall structure of the motor vehicle cabin, but must nevertheless be configured such that the functionality of any operational components within that motor vehicle cabin are not compromised.

It is an object of the present invention to seek to provide an improved steering wheel arrangement.

According to the present invention, there is provided a steering wheel arrangement comprising a steering wheel frame and an airbag unit positioned at the hub region of the steering wheel frame, the airbag unit comprising an airbag-housing and an airbag cover, the airbag cover covering the airbag housing and incorporating an opaque cover portion projecting outwardly beyond a side of the airbag housing, the arrangement further comprising a light source shielded behind the cover portion and positioned outside the airbag housing such that light emitted from the light source passes outwardly from beneath the opaque cover portion and is incident on, and illuminates, part of the steering wheel frame.

Preferably, the part of the steering wheel frame is part of a spoke of the steering wheel frame.

Preferably, the light emitted from the light source illuminates the spoke along the longitudinal axis thereof.

Conveniently, the light emitted from light source illuminates the upper surface of the spoke.

In one embodiment, the spoke extends downwardly with the steering wheel in the neutral position so as to point to the 6 o'clock position on an imaginary clock face.

Preferably, the opaque cover portion extends outwardly over part of the spoke to define a gap therebetween, the light emitted from the light source passing outwardly from beneath the opaque flange portion, through said gap.

Optionally, a side of the airbag housing extends forwardly from the hub of the steering wheel frame, the spoke extends outwardly and forwardly from the hub at an acute angle to the side of the airbag housing so as to form a recess between the housing and spoke, and the cover portion surrounds the recess to form a cavity behind the cover portion, adjacent the side of the airbag, the light source being mounted within the cavity and positioned such that light emitted from the light source passes from beneath the cover portion, through a gap between the cover portion and spoke.

Conveniently, the light source is positioned in close proximity to the undersurface of the cover and is orientated to emit light directly onto the surface of the steering wheel frame from beneath the opaque cover portion.

Preferably, the arrangement further comprises a diffuser positioned between the light source and the surface of the steering wheel frame.

Optionally, the arrangement is further provided with an optical arrangement to direct incident light from the light source out from beneath the cover portion and onto the surface of the steering wheel frame.

In one embodiment, the light source is mounted to the steering wheel frame so as to be directly accessible, through the steering wheel frame, for repair or replacement.

Conveniently, the optical arrangement comprises one or more reflectors.

Preferably, each reflector is a diffuse reflector.

Optionally, the optical arrangement comprises one or more light guides.

In one embodiment, the light source is orientated to direct light upwardly towards the underside of the cover portion, the optical arrangement comprising a reflector provided on the underside of the cover portion for directing the light out from beneath the cover portion and onto the surface of the steering wheel.

The light source may a filament light bulb, LED or other electroluminescent light source, or a LASER.

Optionally, the cover is resiliently mounted to the housing for depression towards the housing, whereby sufficient depression of the cover moves the light source behind a baffle to prevent light emitted from the light source passing outwardly from beneath the cover.

In one embodiment, the baffle is fixed in relation to the steering wheel frame and the light source is mounted for depression with the cover behind the baffle.

In an alternative embodiment, the light source is fixed in relation to the steering wheel frame and the baffle is fixed in relation to the cover for depression with the cover to obstruct the light source.

Conveniently, a portion of the steering wheel frame constitutes the baffle.

Alternatively, the cover portion constitutes the baffle.

In a preferred embodiment, the cover is resiliently mounted to the housing for depression towards the housing, whereby sufficient depression of the cover towards the housing closes the gap between the cover portion and spoke, thereby preventing light emitted by the light source from passing beneath the cover portion and onto the surface of the spoke.

Embodiments of the invention will now be described, by way of example, with reference to the accompanying drawings, in which.

Figure 1:
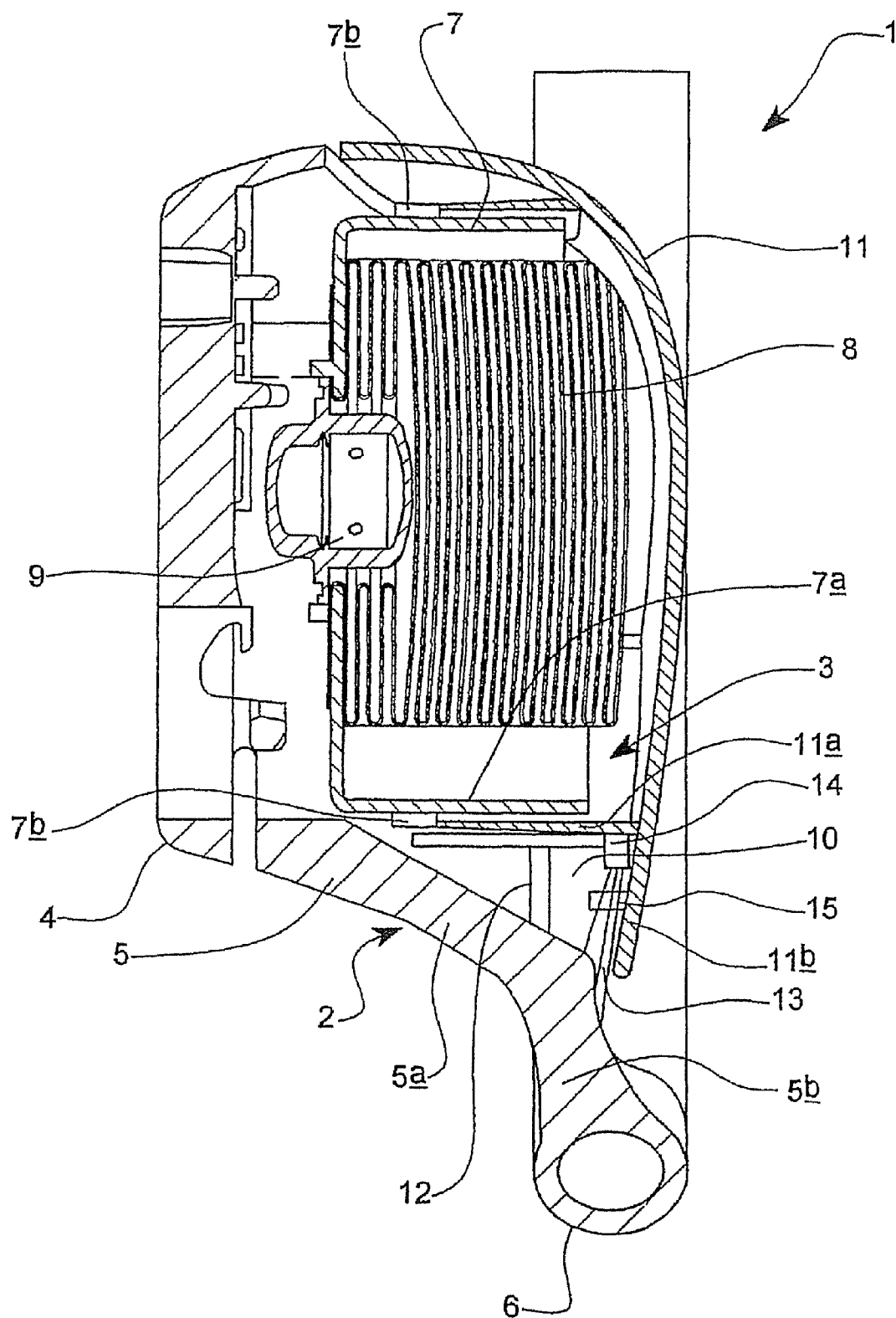
FIG. 1 shows a schematic, cross-sectional side view of a steering wheel arrangement according to a first embodiment of the present invention.

Referring first of all to FIG. 1, a steering wheel arrangement 1 comprises a steering wheel frame 2 and an airbag unit 3 mounted at the centre of the steering wheel frame 2.

The steering wheel frame 2, which may be mounted for rotation with a steering column in the usual manner, comprises a central hub 4, a series of identical spokes 5 (of which only is shown in FIG. 1) extending outwardly and forwardly from the hub 4, and an annular rim 6 supported on the outer ends of the spokes 5.

The spoke 5 shown in FIG. 1 comprises a first section 5a extending forwardly and outwardly from the hub 4 to a point spaced inwardly of the rim 6, and a second section 5b splayed outwardly from the first section 5a to join with the rim 6.

The second, splayed section 5b thus defines a surface portion 5c of the spoke 5 which is substantially in the plane of the annular rim 6 (see FIG. 1).

Figure 2:
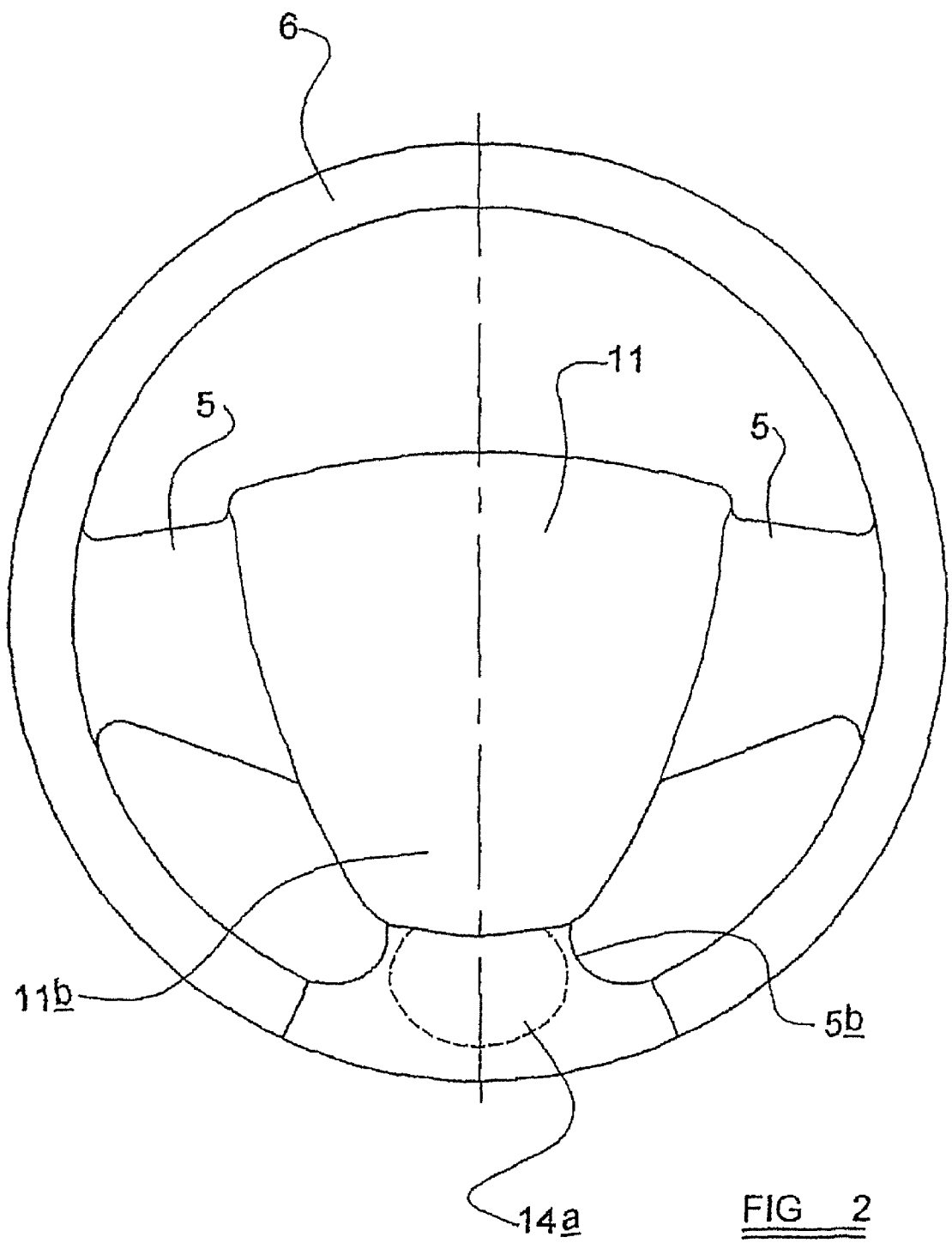
FIG. 2 shows a schematic front view of the steering wheel arrangement of FIG. 1.

Referring now to FIG. 2, it will be noted that the spoke 5 extends downwardly from the hub 4 when viewed from the front (as in FIG. 2), so that, viewed from this position, the spoke 5 points to 6 o'clock on an imaginary clock face.

Referring back again to FIG. 1, the airbag unit 3 is mounted to the steering wheel frame 2 such that it is positioned in the region of the hub 4 of the steering wheel frame 2. The airbag unit 3 comprises a cylindrical airbag housing 7 containing an airbag 8 in fluid communication with an inflator 9; the airbag housing 7 may also contain trigger electronics (not shown) for triggering deployment of the airbag in response to a crash impact. The side 7a of the airbag housing extends forwardly from the hub 4 of the steering wheel frame 2, whereby the spoke section 5a extends at an acute angle to the side 7 of the airbag housing to form a recess 10 therebetween.

The airbag unit 3 is further provided with a generally bowl or dome-shaped cover 11, covering the airbag housing 7. The cover 11 incorporates a downwardly depending cylindrical skirt 11a which is slidably engaged with the cylindrical airbag housing 7, to secure the cover 11 to the housing 7 whilst allowing relative axial sliding movement of the cover 11 and housing 7. Resilient elements 7b (which are shown schematically in FIG. 1 but which may, for example, be springs or the like) are provided between the housing 7 and the skirt 11a which act to bias the cover 11 away from the housing 7, whereby the cover 11 may be depressed towards the housing 7, sliding against the bias of the resilient elements 7b.

The cover 11 further incorporates an opaque cover portion 11b projecting outwardly beyond the side 7a of the airbag housing 7 such that the cover portion 11b extends outwardly over part of the spoke 5, principally the spoke section 5a. The cover portion 11b surrounds the recess 10 to form a substantially closed cavity 12, behind the cover portion 11b, incorporating a small gap or opening 13 between the cover portion 11b and the splayed spoke section 5b.

A light source 14, which may be a collimated light source, is mounted to the downwardly depending skirt portion 11a of the cover 11 within the cavity 12, opposite the gap 13, and positioned such that light emitted from the light source is passes outwardly from beneath the opaque cover portion and is incident on, and illuminates, the splayed section 5b of the spoke 5.

A diffuser 15 is mounted to the underside of the cover portion 11b, in-between the light source 14 and the spoke section 5b, so that light incident on the spoke section 5b is diffuse.

It will be appreciated that the light source 14 is positioned in close proximity to the underside of the cover portion 11b, but at the same time is shielded behind the (opaque) cover portion 11b. In this manner, with the steering wheel arrangement 1 mounted in a motor vehicle, the light source may operate to emit light 14a for diffuse ambient illumination of the spoke section 5b (see FIG. 2) whilst at the same time being shielded from the direct view of the driver or passenger of a vehicle, so that the driver or passenger is not dazzled by light emitted directly from the light source 14.

It will further be appreciated that, because the arrangement allows for the light source to be positioned outside the airbag housing, the operation of the airbag unit is unaffected and may deploy in the normal manner, for example by inflation through an aperture in the cover 11 formed by a break-away panel bounded by a series of "splitlines" in the cover (not shown).

Referring again to FIG. 1, it will be noted that as the cover 11 is depressed towards the housing 7 (against the bias of the resilient elements 7b) the light source 14 will move with the cover 11, whilst movement of the cover 11 towards the housing 7 will itself act to close the gap 13 between the cover portion 11b and the spoke section 5b. Thus, sufficient depression of the cover 11 to close the gap 13 will consequently prevent light from the light source 14 from passing outwardly from beneath the cover portion 11b. It is to be appreciated here that a part of the steering wheel frame 2, specifically the spoke section 5a, acts as a baffle to prevent light emitted from the light source passing outwardly beneath the cover.

Figure 3:
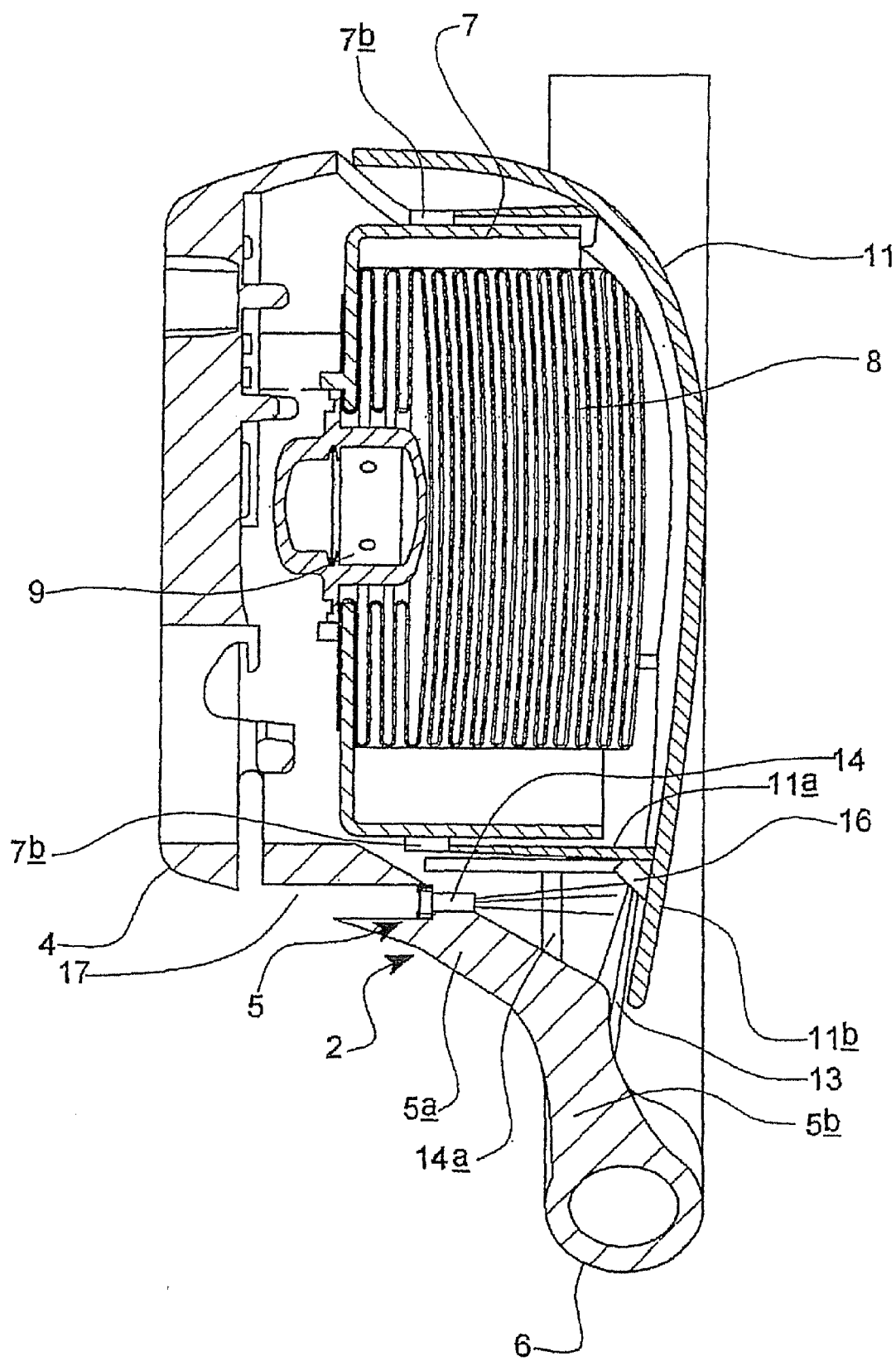
FIG. 3 shows a schematic, cross sectional side view of a steering wheel arrangement according to a second embodiment of the present invention.

Turning now to FIG. 3, an alternative embodiment of a steering wheel arrangement is shown.

The embodiment illustrated in FIG. 3 is in many respects similar to the embodiment shown in FIGS. 1 and 2. In the interests of conciseness, common features between the embodiments have been given like reference numerals and reference is made to the description above for a discussion of these features specifically.

The embodiment shown in FIG. 3 differs from the embodiment shown in FIG. 1 principally in the positioning of the light source 14.

Thus, referring to FIG. 3, the light source 14 is mounted to the spoke section 5a, within the cavity 12, and orientated such that light 14a emitted from the light source 14 is directed upwardly towards the underside of the cover portion 11b.

An optical arrangement is provided for directing light out from beneath the cover portion, through the gap 13 and onto the spoke section 5b, the optical arrangement being in the form of a diffuse reflector 16 mounted to the underside of the cover portion 11b and orientated to re-direct upwardly directed incident light from the light source 14 outwardly beneath the cover portion 11b, through the gap 13.

It will be appreciated that, in common with the embodiment shown in FIGS. 1 and 2, the light source may operate to emit light for diffuse ambient illumination of the spoke section 5b whilst at the same time being shielded from the direct view of the driver or passenger of a vehicle, so that the driver or passenger is not dazzled by light emitted directly from the light source 14. Similarly, it will also be appreciated operation of the airbag unit is unaffected and may deploy in the normal manner.

In addition, it is to be noted that the use of an optical arrangement to re-direct light emitted from the light source affords a much greater degree of design flexibility with regard to the precise positioning of the light source; as such, the light source may be positioned advantageously whilst still operating to provide ambient illumination of the steering wheel.

Thus, in the embodiment specifically shown in FIG. 3, by mounting the light source 14 to the spoke section 5b, and providing an access channel 17 cut into the rear side of the section 5b, it is ensured that the light source 14 is directly accessible, through the steering wheel frame, for repair or replacement. As such, the light source can advantageously be replaced by simply withdrawing the light source 14 through the channel 17, without having to disassemble the airbag unit and, in particular, without having to remove the airbag cover 11.

Referring again to FIG. 3, it will be noted that as the cover 11 is depressed towards the housing 7 (Against the bias of the resilient elements 7b), the light source will remain fixed in relation to the steering wheel frame 2, whilst movement of the cover 11 will again act to close the gap 13 between the cover portion 11b and the spoke section 11b. In this instance, it will be appreciated that, with the gap 13 closed, the cover portion 11b itself acts as a baffle to prevent light emitted by the light source 14 from passing outwardly from beneath the cover portion 11b.

The light source 14 may be any suitable light source and, in particular, may be a filament light bulb, LED or other electroluminescent source, or a LASER source.

Whilst the embodiments described each incorporate a diffusing element between the light source and the surface of the steering wheel to be illuminated (i.e. diffuser 15 or diffuse reflector 16), it is not considered to be essential to use such a diffusing element; indeed, it is envisaged that the surface of the steering wheel frame will itself tend to be textured and, as such, may itself act as a diffuse reflector so that the light observed by the driver is in fact diffuse.

Whilst the embodiments described utilise the actual steering wheel frame or cover portion as a baffle, it is envisaged that a separate baffle could be mounted to the steering wheel frame or cover portion as appropriate.

Although in the embodiment shown in FIG. 3 the optical arrangement comprises only a single reflector 16, it will be appreciated that the optical arrangement may incorporate any number of optical elements, including for example a plurality of reflectors, refracting elements and/or light guides for guiding light emitted by the light source. Indeed, here it is noted that the diffuser 15 in FIG. 2 itself represents an optical arrangement and the diffuser 15 may likewise be used in conjunction with one or more lightguides.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A steering wheel arrangement comprising:
   a steering wheel frame having a hub region;
   an airbag unit positioned at the hub region of the steering wheel frame, the airbag unit including an airbag housing and an airbag cover, the airbag cover covering the airbag housing and having an opaque cover portion projecting outwardly beyond a side of the airbag housing;
   a light source shielded behind the cover portion and positioned outside the airbag housing such that a light emitted from the light source passes outwardly from beneath the opaque cover portion and is incident on and illuminates a part of the steering wheel frame; and
   an optical arrangement to direct incident light from the light source out from beneath the cover portion and onto the surface of the steering wheel frame;
   wherein the light source is orientated to direct light upwardly towards the underside of the cover portion and the optical arrangement includes a reflector provided on the underside of the cover portion for directing the light out from beneath the cover portion and onto the surface of the steering wheel frame.

2. The steering wheel arrangement according to claim 1, wherein the part of the steering wheel frame is a part of a spoke of the steering wheel frame.

3. The steering wheel arrangement according to claim 2, wherein the light emitted from the light source illuminates the spoke along a longitudinal axis thereof.

4. The steering wheel arrangement according to claim 2, wherein the light emitted from the light source illuminates an upper surface of the spoke.

5. The steering wheel arrangement according to claim 2, wherein the spoke extends downwardly with the steering wheel frame in a neutral position so as to point to a 6 o'clock position on an imaginary clock face.

6. The steering wheel arrangement according to claim 2, wherein the opaque cover portion extends outwardly over part of the spoke to define a gap therebetween, the light emitted from the light source passing outwardly from beneath the opaque cover portion, through the gap.

7. The steering wheel arrangement according to claim 2, wherein a side of the airbag housing extends forwardly from the hub of the steering wheel frame, the spoke extends outwardly and forwardly from the hub at an acute angle to the side of the airbag housing so as to form a recess between the housing and the spoke, and the cover portion surrounds the recess to form a cavity behind the cover portion, adjacent the side of the airbag housing, the light source being mounted within the cavity and positioned such that light emitted from the light source passes from beneath the cover portion, through a gap between the cover portion and the spoke.

8. The steering wheel arrangement according to claim 1, wherein the light source is positioned in close proximity to an undersurface of the cover and is orientated to emit the light directly onto the surface of the steering wheel frame from beneath the opaque cover portion.

9. The steering wheel arrangement according to claim 1, wherein the optical arrangement includes one or more reflectors.

10. The steering wheel arrangement according to claim 9, wherein each reflector is a diffuse reflector.

11. The steering wheel arrangement according to claim 1, wherein the optical arrangement includes one or more light guides.

12. The steering wheel arrangement according to claim 1, wherein the light source is selected from a group including: a filament light bulb, LED, non-LED electroluminescent light source, and a LASER.

13. The steering wheel arrangement according to claim 1, wherein the airbag cover is disposed on a front face of the steering wheel frame and the light source is positioned between the steering wheel frame and the airbag cover.

14. A steering wheel arrangement comprising:
a steering wheel frame having a hub region;
an airbag unit positioned at the hub region of the steering wheel frame, the airbag unit including an airbag housing and an airbag cover, the airbag cover covering the airbag housing and having an opaque cover portion projecting outwardly beyond a side of the airbag housing; and
a light source shielded behind the cover portion and positioned outside the airbag housing such that a light emitted from the light source passes outwardly from beneath the opaque cover portion and is incident on and illuminates a part of the steering wheel frame;
wherein the cover is resiliently mounted to the housing for depression towards the housing, whereby sufficient depression of the cover moves the light source behind a baffle to prevent light emitted from the light source passing outwardly from beneath the cover portion.

15. The steering wheel arrangement according to claim 14, wherein the baffle is fixed in relation to the steering wheel frame and the light source is mounted for depression with the cover behind the baffle.

16. The steering wheel arrangement according to claim 14, wherein the light source is fixed in relation to the steering wheel frame and the baffle is fixed in relation to the cover for depression with the cover to obstruct the light source.

17. The steering wheel arrangement according to claim 15, wherein a portion of the steering wheel frame defines the baffle.

18. The steering wheel arrangement according to claim 16, wherein the cover portion defines the baffle.

19. A steering wheel arrangement comprising:
a steering wheel frame having a hub region;
an airbag unit positioned at the hub region of the steering wheel frame, the airbag unit including an airbag housing and an airbag cover, the airbag cover covering the airbag housing and having an opaque cover portion projecting outwardly beyond a side of the airbag housing;
a light source shielded behind the cover portion and positioned outside the airbag housing such that a light emitted from the light source passes outwardly from beneath the opaque cover portion and is incident on and illuminates a part of the steering wheel frame, the light source positioned in close proximity to an undersurface of the cover and is orientated to emit the light directly onto the surface of the steering wheel frame from beneath the opaque cover portion; and
a diffuser positioned between the light source and the surface of the steering wheel frame.

20. The steering wheel arrangement according to claim 19, wherein the light source is mounted to the steering wheel frame so as to be directly accessible through the steering wheel frame for repair or replacement.

21. A steering wheel arrangement comprising:
a steering wheel frame having a hub region;
an airbag unit positioned at the hub region of the steering wheel frame, the airbag unit including an airbag housing and an airbag cover, the airbag cover covering the airbag housing and having an opaque cover portion projecting outwardly beyond a side of the airbag housing; and
a light source shielded behind the cover portion and positioned outside the airbag housing such that a light emitted from the light source passes outwardly from beneath the opaque cover portion and is incident on and illuminates a spoke of the steering wheel frame;
wherein the opaque cover portion extends outwardly over part of the spoke to define a gap therebetween, the light emitted from the light source passing outwardly from beneath the opaque cover portion, through the gap; and
wherein the cover is resiliently mounted to the housing for depression towards the housing, whereby sufficient depression of the cover towards the housing closes the gap between the cover portion and spoke, thereby preventing light emitted by the light source from passing beneath the cover portion and onto the surface of the spoke.

* * * * *